June 27, 1967     A. S. NOWSELSKI ET AL     3,328,095
AXIALLY ADJUSTABLE BEARING SUPPORT
Filed July 2, 1965
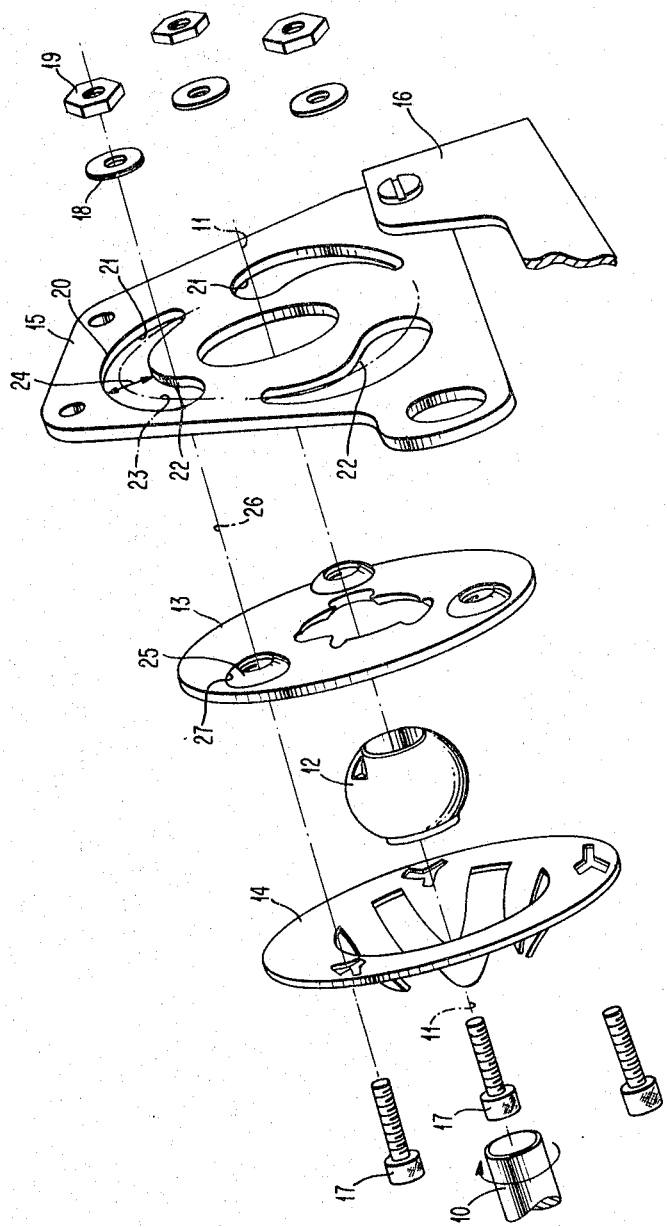
INVENTORS.
ANTHONY S. NOWSELSKI
BERNARD W. WITTWER
BY *E. Ronald Coffman*
ATTORNEY.

3,328,095
AXIALLY ADJUSTABLE BEARING SUPPORT
Anthony S. Nowselski and Bernard W. Wittwer, Lexington, Ky., assignors to International Business Machines Corporation, Armonk, N.Y., a corporation of New York
Filed July 2, 1965, Ser. No. 469,193
9 Claims. (Cl. 308—63)

The bearing support of this invention permits axial adjustment of the supported bearing without the use of shims or other so-called "cut and try" adjusting inserts. This invention is of particular manufacturing significance in the simplicity of its structural design, and the speed of its assembly and adjustment.

Precision machinery of the type that has multiple interacting shafts, requires accurate alignment between elements such as gears, cams, etc., to insure proper interaction. Axial alignment of such shafts is currently accomplished by the maintenance of tolerance limits in support bearing and shaft manufacture and by the use of shimming washers. The greater the tolerance accuracy, the higher the cost.

Shimming washers or sleeves are individually selected at the time of assembly to fit the particular tolerance deviation of the specific parts. This operation involves a first assembly or at least a measurement, a computation of the amount of space requiring shims and a second assembly using the shims. As the shims themselves must be precise to the ultimate tolerance level sought, their selection is time-consuming, require a skilled operator, and hence, is expensive.

It has thus been an object of this invention to provide a bearing support structure for performing the function now accomplished by shims without the requirement of accurate part construction, skilled labor for assembly or any extraordinary assembly time.

Another object of this invention has been to provide a self-shimming bearing support that is adjustable throughout the range of permitted tolerance deviation simply by rotation of a part during final assembly.

One novel concept of this invention includes the use of the camming action between a cam formed by a pair of separated edge portions, preferably of an elongated opening, and a tapered projection that assumes different axial positions therein, depending upon the distance of separation of the edge portions with which it is cooperating. This concept permits manufacture of the entire cam surface by a simple punch press operation. The use of an opening as a cam also permits convenient assembly by the use of bolts or similar fasteners that extend through the parts and through the cam openings to thus permit relative movement of the parts while completely assembled except for final tightening.

Another important concept of this invention involves the combination of the self-shimming structure as described above, with a bearing of the self-aligning type. In any adjustable coupling there is a less accurate reference available to provide absolute angular alignment between adjustable parts. The cost of maintaining manufacturing tolerance to assure alignment between adjustable parts increases as a high order inverse function of such tolerance. The self-aligning bearings currently available compensate inherently for any slight angular misalignment between the adjustable parts of our bearing support, and accordingly our bearing support has particular economical cooperation therewith.

The foregoing and other objects, concepts, and advantages of our invention will be apparent from the following more particular description of a preferred embodiment thereof wherein reference is made to the accompanying drawing of which:

The figure is an exploded perspective view of a bearing and support structure therefor constructed in accordance with the concepts of our invention.

In the figure there is shown a mounting assembly for a shaft 10 having a rotational axis 11 that is defined by self-aligning bearing 12. Support means for the bearing 12 is provided by a shimming plate 13, a clamping plate 14, which permits limited angular reorientation of the bearing according to known principles and a substantially stationary mounting plate 15. A frame 16 supports the mounting plate 15 and the mounting plate 15 can be formed as an intrical part of the frame. Three bolts 17, or similar fastening devices, can be extended through the shimming, clamping, and mounting plates 13, 14 and 15 and receive washers 18 and nuts 19 to securely clamp the assembly together.

The self shimming function of this invention is provided by three openings 20 formed in the mounting plate 15, each defined by a pair of coplanar inner and outer primary surface edges or corner portions 21 and 22, respectively. The surface edge portions 21 and 22 are substantially symmetrically spaced radially from an arc 23 that is centered about the rotational axis 11 defined by the bearing 12. The edge portions 21 and 22 are spaced apart radially by a distance 24 that varies continuously along the circumferential extent of the arc 23 from a small radial distance at one end of the arc to a relatively large radial distance at the other end of the arc to provide a camway. The openings 20 also provide a convenient path for the bolts 17 through mounting plate 15 to permit angular displacement therebetween. It will be understood, however, that the principles of this invention can be employed by generating edge portions 21 and 22 other than by a complete perforation of the mounting plate 15. In such event some provision must be made to permit angular displacement between the bolts 17, and either the mounting plate 15 or shimming plate 13 to permit full operation of the invention.

The shimming plate 13 is provided with three cam follower portions or projections 25 which extend axially of the assembly and are tapered symmetrically about individual axes 26 that approximately intersect the arcs 23 when the plates are in operative engagement. The projections 25 each have an outer tapered surface 27 that is preferably spherical for manufacturing convenience. The surface 27 engages the edge portions 21 and 22 at different axial locations according to the circumferential portion of the openings 20 into which it is inserted. The bearing support thus described is adjusted axially simply by rotating the shimming plate 13 clockwise (the direction of shaft rotation) to take up axial play through cooperation between projections 25 and openings 20. Nuts 19 are then tightened on bolts 17 to provide a rigid assembly. If the bearing were constructed to support a shaft that rotated counterclockwise the openings 20 will be reversed to assure continuous locking of the parts. The locking action of the parts is further assured by the three point clamping action provided by the bolts 17 which pass through the projections 25 to assure a statically determinate structure.

Those skilled in the art will appreciate that we have provided a particuarly reliable, inexpensive, and convenient self shimming bearing support that is useful whenever axial play is a concern. It will be understood that various changes can be made in the illustrated preferred embodiment. For example, the symmetry described as preferred can be deviated from by proper design of the projections 25 and openings 20, and the openings 20 can be formed in the shimming plate 13 and the projections 25 formed on the mounting plate 15, all without departing from the spirit and scope of this invention.

We claim:
1. In combination, a bearing having an axis and adapted for rotatably supporting a shaft and an improved support means therefor comprising:
 a substantially stationary mounting plate,
 a shimming plate supportingly connected to the bearing,
 one of said plates having a camway defined by surface edge portions that are each symmetrical about an arc centered on the axis and are separated radially by a distance that varies along the circumferential extent of said arc,
 the other of said plates having an axially extending tapered projection for engaging said surface edge portions, and
 means securely connecting said plates one to the other.

2. In combination, a bearing having an axis and adapted for rotatably supporting a shaft and an improved support means therefor comprising:
 a substantially stationary mounting plate,
 a shimming plate supportingly connected to the bearing,
 one of said plates having at least three camways, each defined by a pair of substantially co-planar surface edge portions that are symmetrical about an arc centered on the axis and are separated radially by a distance that varies along the circumferential extent of said arc,
 the other of said plates having a plurality of cam follower projections equal in number to the number of said camways for individually engaging respective camways, each of said projections having an axially extending tapered outer surface for engaging said surface edge portions, and
 means securely connecting said plates one to the other.

3. The combination as defined in claim 2 wherein said radial distance between the pair of edge portions of each camway varies substantially continuously from a relatively small radial extent at one end of said arc to a relatively large radial extent at the other end of said arc.

4. In combination, a bearing having an axis and adapted for rotatably supporting a shaft and an improved support means therefor comprising:
 a substantially stationary mounting plate,
 a shimming plate supportingly connected to the bearing,
 one of said plates having at least three openings each defined by a pair of primary surface edge portions that are symmetrical about an arc centered on the axis and are separated radially by a distance that varies along the circumferential extent of said arc,
 the other of said plates having a plurality of cam follower projections equal in number to the number of said openings, each of said projections having an axially extending tapered outer surface for engaging said surface edge portions, and
 means securely connecting said plates one to the other.

5. In combination, a self-aligning bearing having an axis and adapted for rotatably supporting a shaft and an improved support means therefor comprising:
 a substantially stationary mounting plate,
 a shimming plate supportingly connected to the bearing,
 one of said plates having at least three camways each defined by a pair of substantially co-planar surface edge portions that are symmetrical about an arc centered on the axis and are separated radially by a distance that varies along the circumferential extent of said arc,
 the other of said plates having a plurality of cam follower projections equal in number to the number of said camways for individually engaging respective camways, each of said projections having an axially extending tapered outer surface for engaging said surface edge portions, and
 means securely connecting said plates one to the other.

6. In combination, a bearing having an axis and adapted for rotatably supporting a shaft and an improved support means therefor comprising:
 a substantially stationary mounting plate having at least three openings formed therein, said openings each being defined by a pair of substantially co-planar surface edge portions that are symmetrical about an arc centered on the axis and are separated radially by a distance that varies along the circumferential extent of said arc,
 a shimming plate supportingly connected to the bearing and having a plurality of cam follower projections thereof equal in number to the number of said camways for individually engaging respective camways, each of said projections having an axially extending tapered outer surface for engaging said surface edge portions, and
 means securely connecting said plates one to the other.

7. In combination, a bearing having an axis and adapted for rotatably supporting a shaft and the improved support means therefor comprising:
 a substantially stationary mounting plate,
 a shimming plate supportingly connected to the bearing,
 one of said plates having at least three openings, each defined by a pair of substantially co-planar surface edge portions that are symmetrical about an arc centered on the axis and are separated radially by a distance that varies circumferentially of said arc,
 the other of said plates having a plurality of cam follower projections equal in number to the number of said camways for individually engaging respective camways, each of said projections having an axially extending tapered outer surface for engaging said surface edge portions, and
 a plurality of mounting bolts extending through both said plates and through said openings and nut means mounted on each bolt for securely clamping said plates one to the other.

8. The combination as defined in claim 7 wherein said mounting bolts extend along the axis of and through said cam follower projections.

9. In combination, a bearing having an axis and adapted for rotatably supporting a shaft and an improved support means therefor comprising:
 a substantially stationary mounting plate,
 a shimming plate supportedly connected to the bearing,
 one of said plates having at least three openings, each defined by a pair of primary surface edge portions that extend principally along an arc centered on the axis and are separated radially by a distance that varies along the circumferential extent of said arc,
 the other of said plates having a plurality of cam follower projections equal in number to the number of said openings, each of said projections having an axially extending tapered outer surface for continuously engaging said surface edge portions, and
 means securely connecting said plates one to the other.

References Cited

UNITED STATES PATENTS

| | | | |
|---|---|---|---|
| 303,784 | 8/1884 | Adams | 308—63 X |
| 2,832,905 | 4/1958 | Clay | 308—62 X |

MARTIN P. SCHWADRON, *Primary Examiner.*

G. N. BAUM, *Assistant Examiner.*